March 17, 1959  E. M. WHITLEY ET AL  2,877,780
QUICK RELEASE VALVE
Filed Oct. 19, 1956
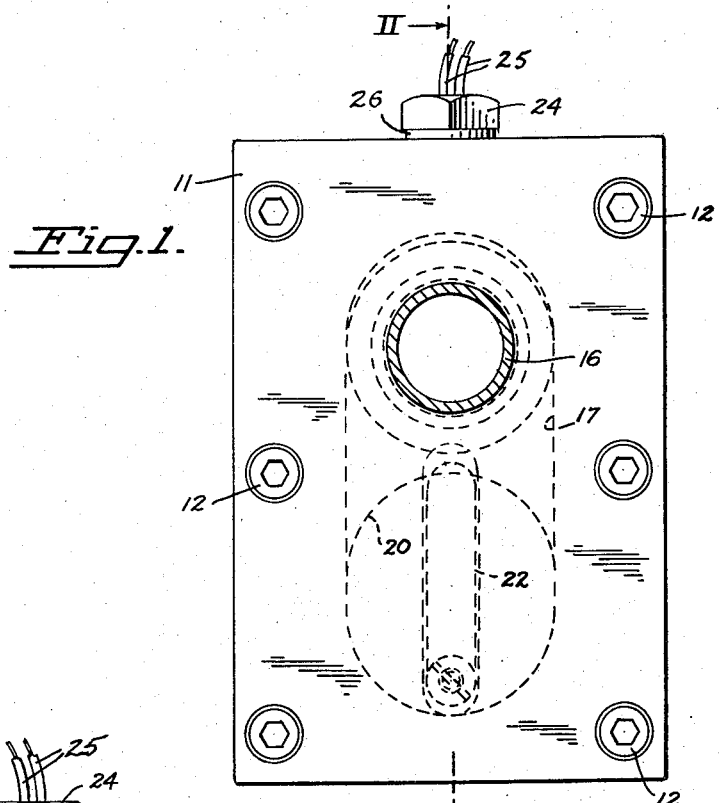
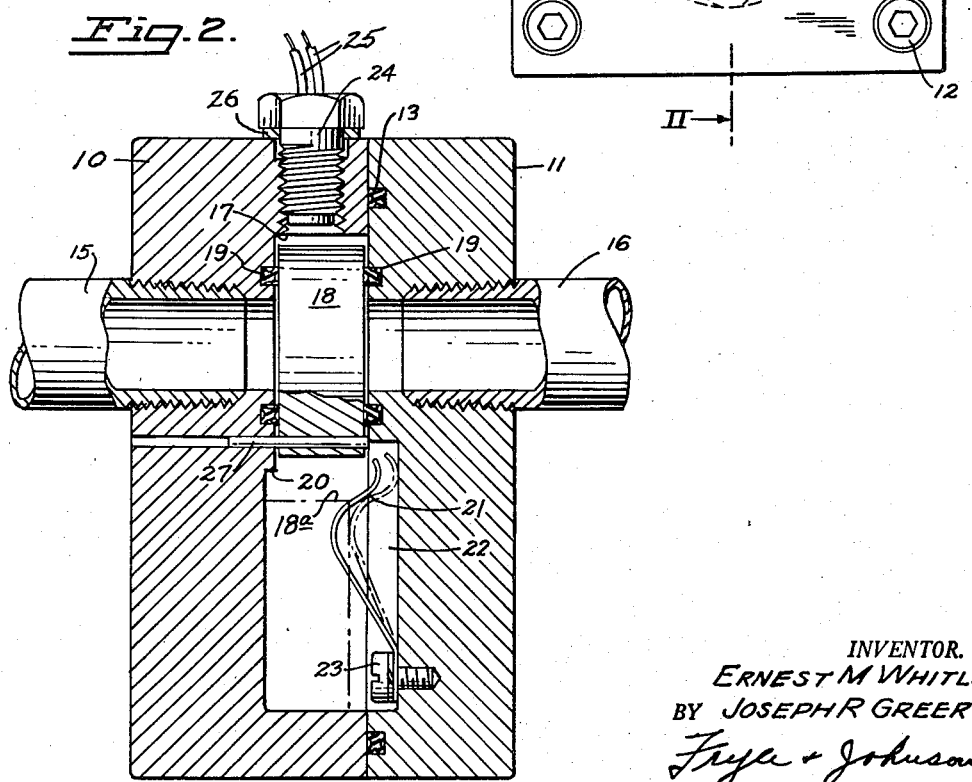
INVENTOR.
ERNEST M WHITLEY
BY JOSEPH R GREER
ATTORNEYS

2,877,780

QUICK RELEASE VALVE

Ernest M. Whitley, Palo Alto, and Joseph R. Greer, Mountain View, Calif., assignors to Beckman & Whitley, Inc., San Carlos, Calif., a corporation of California Application October 19, 1956, Serial No. 617,023

4 Claims. (Cl. 137—70)

This invention relates to valves adapted to be opened quickly and in instant response to any event which may be recorded and transmitted electrically or by any other detonation producing phenomenon.

There are various requirements for valves which seal off pressure to be released only on the occurrence of certain other physical or mechanical events and which must open quickly to a position permitting full flow.

It is the object of the present invention to provide a valve which satisfies these requirements and through simple, inexpensive and positive acting structure effects complete opening of a sealed passage.

A further object of the invention is to provide means for holding the valve in its open position.

Still further and more specific objects and advantages of the invention are made apparent in the following specification wherein reference is made to the accompanying drawing for a detailed description of the invention.

In the drawing:

Fig. 1 is a view in end elevation of a valve embodying the present invention, and Fig. 2 is a sectional view taken on the line II—II of Fig. 1.

The valve is illustrated as having a body 10 and a cover plate 11 secured thereto as by screws illustrated in Fig. 1 as socket head cap screws 12. A seal shown at 13 is preferably provided between the body and cover and may be in the form of an O-ring or a so-called "Quad" gasket received in a suitable groove formed in the cover member. The body and cover have aligned threaded bores for the reception of inlet and outlet conduits illustrated at 15 and 16, respectively. The body has an enlongated recess or cavity therein shown at 17, one end of which receives a disk-shaped valve gate 18 held in place and sealed to prevent the passage of fluid under pressure from the inlet 15 to the outlet 16 by means of O-rings or Quads illustrated at 19 received in suitable grooves in the cover member. The opposite end of the body cavity 17 forms a receptacle to receive the gate 18 when it moves to an open position and this portion of the cavity is slightly deeper on the body side of the valve to provide a shoulder 20 which cooperates with a spring 21 to hold the valve gate in its open position and to prevent it from rebounding toward a closed position when it is forceably opened. The spring 21 is mounted in an elongated recess 22 in the cover plate 11 wherein it is secured as by a screw 23. In the present illustration, the position of the valve member 18 after it has been opened is illustrated in broken lines at 18a with the spring 21 under slight tension retaining the valve gate against the wall of the recess in the body and below the shoulder 20 so that its return to a closed position is prevented. The normal position of the spring is as shown in full lines. The side of the body adjacent the valve gate in its closed position, here shown as the top of the body member, is bored and tapped for reception of an explosive cell or cartridge 24 of conventional construction which has the appearance of a cap screw but is hollow and charged with an explosive substance adapted to be detonated by a spark or fusing membrane energized by a circuit which includes a pair of wires 25. The wires enter the cartridge through its closed end. A gasket 26 is preferably used under the head of the cartridge.

In operation and upon the occurrence of an event which energizes the circuit for detonating the charge in the cartridge, the detonation produces pressure in the recess 17 above the valve gate 18 to force it to its open position which is in a downward direction as herein illustrated. To insurse against partial opening of the gate and escape of pressure into the lines 15 or 16 which might prevent its full opening, a shear pin 27 extends through aligned holes in the valve gate and in the body 10 of the valve. This pin is pressed into place during assembly of the valve having an interference fit with these holes to prevent its accidental dislodgement. It is made of a material and diameter suitable to prevent shearing of the pin and opening of the valve gate until pressure created by the cartridge 24 is sufficient to move the valve forcibly to its full open position. The holes for the shear pin are drilled all of the way through the body member and the gate member so that the separate portions thereof remaining in these members after it has been sheared may be easily driven out, it being understood that the valve is disassembled, reset and recharged after each operation.

Downward or opening motion of the valve gate deflects the spring 21 toward the position shown in broken lines. This tensions the spring causing it to urge the gate toward the left, as shown and under the shoulder 20 to prevent rebound of the gate toward its closed position.

We claim:

1. A valve comprising a body with a passage therethrough providing an inlet and an outlet for fluid, said body having a cavity intercepting said passage for the reception of a valve gate in a position to close said passage, said cavity having an extension to receive said valve gate in an open position, a stemless valve gate in said cavity, an explosive cell opening into said cavity to create pressure when detonated to force the valve gate from its closed to its open position, said valve gate being smaller than the cavity, and said cavity having a deep portion in said extension to provide a shoulder to prevent movement of the gate to closed position after it has opened.

2. A valve comprising a body with a passage therethrough providing an inlet and an outlet for fluid, said body having a cavity intercepting said passage for the reception of a valve gate in a position to close said passage, said cavity having an extension to receive said valve gate in an open position, a valve gate in said cavity, an explosive cell opening into said cavity to create pressure when detonated to force the valve gate from its closed to its open position, said cavity having a deep portion in said extension ot provide a shoulder to prevent movement of the gate to closed position after it has opened, and a spring in said cavity opposite said deep portion to urge the gate when open into the deep portion.

3. A valve comprising a body with a passage therethrough providing an inlet and an outlet for fluid, said body having a cavity intercepting said passage for the reception of a valve gate in a position to close said passage, said cavity having an extension to receive said valve gate in an open position, a stemless valve gate in said cavity, means to create pressure in the cavity on the side of the gate opposite the extension of the cavity for moving the gate from its closed to its open position, means to resist opening of the gate until said pressure attains a value sufficient to fully open the gate, resilient means in the cavity extension to hold the gate against one side of the cavity, said side having a shoulder to prevent return of the gate toward its closed position.

4. An explosive actuated valve comprising a body with a straight through opening for the passage of fluid, a cavity intercepting said opening and larger than the opening to provide valve seats surrounding the opening, a disc-shaped valve gate disposed in the cavity in contact with said seats to close said opening, an explosive charge communicating with one side of the cavity, an extension of the cavity communicating with the other side to receive the valve gate when the charge is detonated, said extension of the cavity being wider than the thickness of the valve gate and having a spring on one side and a shoulder on the other side, said spring acting when the valve is opened to hold the gate against the shouldered side to prevent closing movement of the valve gate.

References Cited in the file of this patent

UNITED STATES PATENTS

| 477,608 | Pratt | June 21, 1892 |
| 973,606 | Worley | Oct. 25, 1910 |
| 2,405,439 | Lubbock et al. | Aug. 6, 1946 |
| 2,638,124 | Nickerson | May 12, 1953 |